William J. Harris.
Machine for driving wedges in Stow's Foundation Pavement.

No. 120,193.

Patented Oct. 24, 1871.

Witnesses.

Inventor.
William J. Harris.

120,193

UNITED STATES PATENT OFFICE.

WILLIAM J. HARRIS, OF ELIZABETH, NEW JERSEY, ASSIGNOR OF ONE-HALF HIS RIGHT TO SAMUEL STEWART, OF POTSDAM, NEW YORK.

IMPROVEMENT IN MACHINES FOR DRIVING WEDGES IN PAVEMENTS.

Specification forming part of Letters Patent No. 120,193, dated October 24, 1871; antedated October 14, 1871.

*To all whom it may concern:*

Be it known that I, WILLIAM J. HARRIS, of the city of Elizabeth, in the county of Union and State of New Jersey, have invented a Machine for Driving Wedges in Stow's Foundation Pavement, of which the following is a specification, reference being had to the accompanying drawing, in which—

Figure 1:
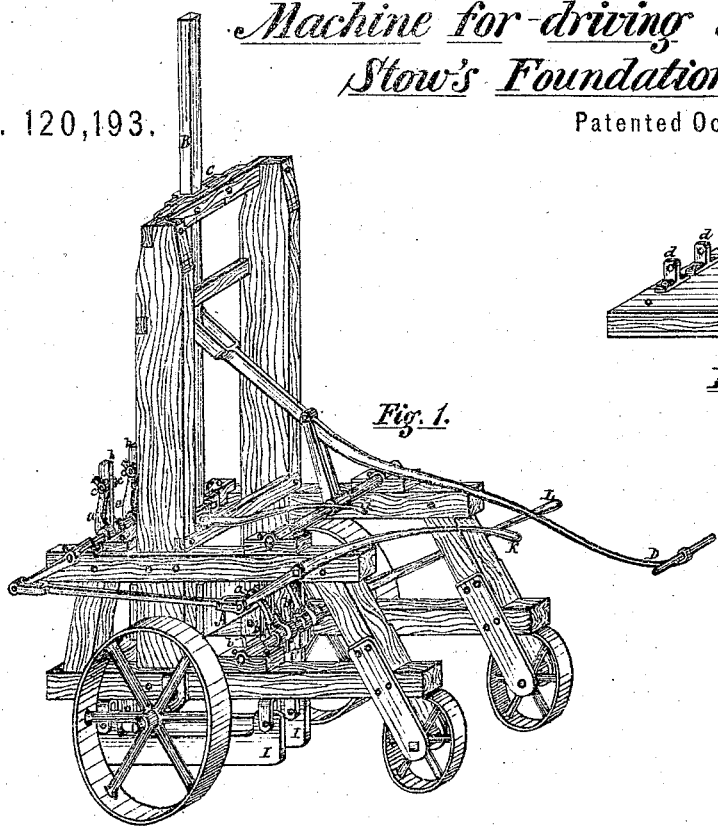
Figure 4:
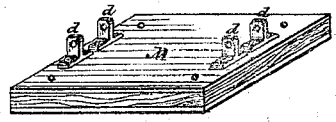
Figure 2:
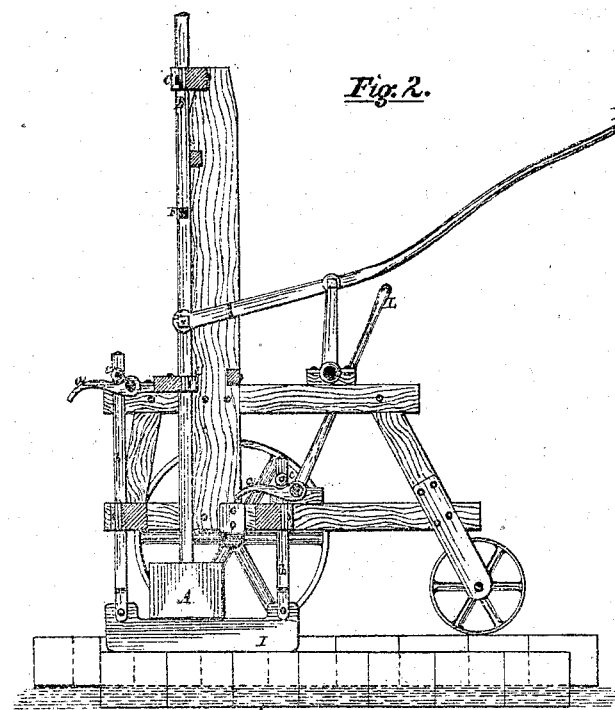
Figure 3:
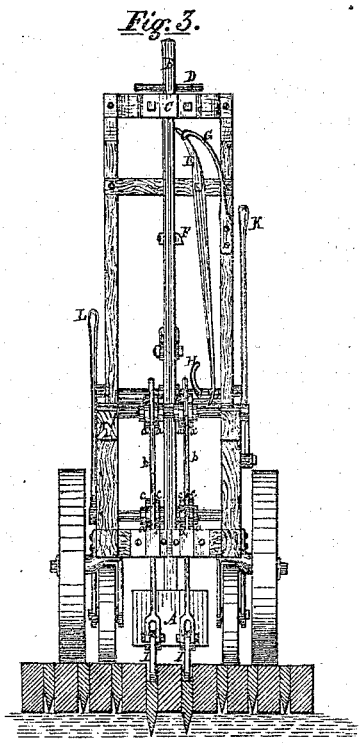

Figure 1 is a perspective view looking from the left side and rear. Fig. 2 is a longitudinal section. Fig. 3 is a front end elevation, and Fig. 4 is a view of the leveling-plate detached.

The object of my invention is to accomplish the work by mechanical means more rapidly and with less labor than it could be done by hand-power alone.

I construct a strong wooden pavement whereon the different working parts are secured and arranged as hereinafter shown, and which is mounted on wheels, so that the machine may be readily moved about as the work progresses. Operating in the center of this frame-work is the drop-hammer, with head A, and cast integral with the same the shank B, which slides through the guide-bearings C C, that are bolted to cross-bars extending between upright cheek pieces forming part of the frame, all as shown in Figs. 1, 2, and 3. D is the lever for raising the hammer, working in connection with a double-cranked rock-shaft, hung in bearings on top of the frame, and provided with jaws at one end, through which it is pivoted to the shank B, as shown in Figs. 1 and 2. E is the stop or clutch-lever, pivoted vertically to a cross-bar extending between the cheek pieces before mentioned, near the top of the same, as shown in Fig. 3. Pivoted horizontally to another cross-bar, as shown in Figs. 1 and 2, is the trip-lever H, the short end of which engages with the long end of the lever E. Directly under the hammer-head A are the parallel swages I I, pivoted at each end to the vertical guide-rods $b\ b\ b\ b$, sliding through bearings on the lower part of the frame, as shown in Figs. 1, 2, and 3. Pivoted at the left-hand side of the machine is the lever K, for raising the forward ends of the swages, being connected by a rod and crank to a shaft hung at the forward end of the machine, as shown more clearly in Fig. 1. This shaft is provided with cams $a\ a\ a\ a$, which engage with friction-pulleys $c\ c\ c\ c$, attached to the forward guide-rods. On the right-hand side is the lever L for raising the rear ends of the swages, keyed to a shaft hung at the rear end of the machine, as shown in Figs. 1 and 2. This shaft is also provided with cams, which engage in a similar manner with friction-pulleys attached to the rear guide-rods. The leveling-plate M, shown in Fig. 4, is exchangeable with the swages, which can be readily removed. When in use the plate is pivoted to the guide-rods through the ears $d\ d\ d\ d$.

When in operation the machine is moved across the street from side to side, the swages I I following the seams between the paving-blocks, resting on top of the wedges operating upon two rows at a time. By depressing the lever D the hammer is raised, as shown in Fig. 1, and held in that position by the clutch-lever E, the short end of which is retained beneath the stop-bolt F, shown on the shank B in Figs. 2 and 3, by the spring G, shown on one of the cheek pieces in Fig. 3, till released by means of the trip-lever H, when the hammer falls upon the swages, driving down the wedges immediately beneath them, as shown in Figs. 2 and 3. When the machine is moved about, or from one set of seams to another, the hammer is raised and the levers K and L are depressed, which operate the cams on their respective shafts, in connection with the friction-pulleys, to lift up the corresponding guide-rods and raise the swages, so as to clear the pavement, all as shown in Fig. 1. While running through the seams it is only necessary to raise the forward ends, as the machine advances, the levers D and K serving as handles to assist in moving, as desired. After the driving operation is completed the swages are removed, and the plate M attached, which rests on top of the blocks, and is operated upon by the hammer in the same manner as before described, in relation to the swages, for the purpose of leveling the surface of the pavement which may have become uneven while driving the wedges.

I claim as my invention—

1. The combination of a vertical drop-hammer with the lever D, clutch E, and trip H, to operate either in connection with the swages I I or with the leveling-plate M.

2. The combination of the swages I I or of the leveling-plate M, when either are in use, with the levers K and L, cams $a$, guide-rods $b$, and friction-pulleys C, all constructed and arranged substantially as shown and described, for the objects herein set forth.

WILLIAM J. HARRIS.

Witnesses:
SAMUEL STUART,
H. LISLE FLEMING.